United States Patent [19]

Kemp

[11] Patent Number: 5,156,704
[45] Date of Patent: Oct. 20, 1992

[54] METHOD FOR FABRICATING MAGNETIC HEAD AIR BEARING SLIDERS

[75] Inventor: Thomas H. Kemp, Rancho Santa Fe, Calif.

[73] Assignee: Computer and Communications Technology Corp., San Diego, Calif.

[21] Appl. No.: 531,941

[22] Filed: Jun. 1, 1990

[51] Int. Cl.⁵ .............................. G11B 5/42; G11B 5/60
[52] U.S. Cl. ........................................ 156/655; 156/656; 156/657; 156/663; 156/645; 29/603; 360/103
[58] Field of Search ................... 360/103; 29/603; 156/655, 656, 645, 657, 663, 667; 252/79.2

[56] References Cited

U.S. PATENT DOCUMENTS

| | | | |
|---|---|---|---|
| 3,577,634 | 5/1971 | Secrist | 29/603 |
| 3,678,211 | 7/1972 | Hoogendorn et al. | 65/48 X |
| 3,855,625 | 12/1974 | Garnier et al. | 360/103 |
| 3,922,776 | 12/1975 | Alger et al. | 29/603 |
| 4,218,715 | 8/1980 | Garnier | 360/103 |
| 4,225,891 | 9/1980 | Plotto | 360/103 |
| 4,298,899 | 11/1981 | Argumedo et al. | 360/122 |
| 4,472,240 | 9/1984 | Kameyama | 156/657 X |
| 4,475,135 | 10/1984 | Warner et al. | 360/103 |
| 4,549,238 | 10/1985 | Ertingshausen et al. | 360/103 |
| 4,555,739 | 11/1985 | Le Van et al. | 360/103 |
| 4,644,641 | 2/1987 | Verdone | 29/603 |
| 4,646,180 | 2/1987 | Ohtsubo | 360/103 |
| 4,673,996 | 6/1987 | White | 360/103 |
| 4,704,788 | 11/1987 | Eckstein | 29/603 |
| 4,796,126 | 1/1989 | Tscuchiya et al. | 360/103 |
| 4,807,519 | 9/1989 | White | 360/103 |
| 4,870,519 | 9/1989 | White | 360/103 |
| 4,926,274 | 5/1990 | Saitoh et al. | 360/102 |
| 4,948,460 | 8/1990 | Sandaiji et al. | 156/630 |

FOREIGN PATENT DOCUMENTS

56-83869 7/1981 Japan.
58-102362 6/1983 Japan.

*Primary Examiner*—Thi Dang
*Attorney, Agent, or Firm*—Spensley Horn Jubas & Jubitz

[57] ABSTRACT

A method of manufacturing structural elements in magnetic head air bearing sliders by etching. The invention forms transverse pressure contours on the edges of a slider air bearing surface by first forming slots in a slider blank adjacent the location where air bearing surfaces are to be formed. The slots are filled with an etchable material and the slider blank is machined to form air bearing structures. The etchable material is positioned so as to form a part of the side edge of the air bearing structure. The slider blank is then subjected to an etching process that principally etches the etchable material. By proper positioning and etching, the etchable material forms a transverse pressure contour on the side edge of the air bearing structure. The invention has other uses with respect to forming complex, high precision structures within a slider body. Any structure that can be formed by etching an etchable material away from the bulk material of the slider body can be manufactured.

22 Claims, 2 Drawing Sheets

METHOD FOR FABRICATING MAGNETIC HEAD AIR BEARING SLIDERS

BACKGROUND OF THE INVENTION

1. Field of the Invention

This invention relates to a method of manufacturing magnetic head air bearing sliders, and more particularly to a method for fabricating structural elements in magnetic head air bearing sliders using an etching process.

2. Description of Related Art

Magnetic recording systems utilizing transducers that are supported by an air bearing layer as they move relative to the surface of a magnetic recording disk are well known in the art. Such transducers "fly" on a layer of pressurized air at just a few microinches above a rotating disk surface. The transducer is mounted in a slider assembly which has a contoured surface. The air bearing layer is produced by pressurization of the air as it flows between the disk and slider, and is a consequence of the slider contour and relative motion of the two surfaces. The purpose of the air bearing is to provide, with minimal or no contact, a very narrow clearance between the slider and rotating disk. This allows a high density of magnetic data to be transferred and reduces wear and damage to the magnetic assembly and recording media during operation.

Typical sliders of the prior art, as illustrated in FIG. 1, utilize at least two lower rails 1a, 1b having flat surfaces 2 oriented toward the recording medium. Each of these rails 1a, 1b has a tapered forward surface 3a, 3b oriented against the direction of rotation 4 of the recording medium. The rotating recording medium forces air by viscous effects into the tapered forward surfaces 3a, 3b and thereby produces a pressure beneath each of the rails 1a, 1b, resulting in the air bearing. These sliders are typically gimbal-mounted to a flexure which is attached to an arm. The arm is driven by an actuator which positions the transducer over the recording surface from one data track to another. The arm can move in a linear motion (which is termed linear access) or it can rotate about a pivot point (which is termed rotary access). With rotary access, the slider will be positioned at varying angles with respect to the direction of disk rotation as the slider moves over the recording surface. This angular orientation is referred to as the "skew" angle.

When a typical slider is positioned so as to have any angular skew, the rotation of the recording medium introduces pressurized air at the forward edge of the slider, thereby generating the air bearing. However, this air is pressurized at a reduced value because of the skew, thus giving rise to a reduction in the flying height. Also, the skew angle gives rise to a roll of the slider such that the air bearing flying height is not uniform under both of the rails 1a, 1b. Accordingly, the position of the transducer with respect to the recording medium can vary as the slider is caused to roll in one direction or the other or fly at different heights. Such variations in flying height adversely affect the data transfer between transducer and recording medium. In particular, the density of bit storage is adversely affected if the flying height of a slider is increased.

Furthermore, the slider must move radially across the recording medium at a substantial rate of speed to access various portions of the medium. This motion also introduces air under one edge of each slider rail 1a, 1b and results in a roll of the slider and a change in the spacing between the transducer and the recording medium. When any of these variations of spacing occur, particularly with a substantially reduced spacing between the slider and the recording medium, contact may occur between the slider (and its transducer) and the recording medium, or at least potentially rough surfaces thereof. Any such contact introduces wear into the slider and the recording surface.

Moreover, the relative speed between the magnetic disk and the slider varies as a slider moves from an inner diameter of the recording medium to an outer diameter. Such variations in speed result in variations of air flow under a slider, which changes the flying height of the slider. As noted previously, such variations in flying height adversely affect the data transfer between transducer and recording medium.

One solution that has been proposed for minimizing change in the flying height and roll of a slider as skew angle or relative air flow speed changes is to provide a transverse pressurization contour along each side edge of the air bearing surfaces 2 of the slider such that any air flow from the side of the slider assembly due to skew angle and/or access velocity produces pressurization adjacent to one side edge and depressurization (or expansion) adjacent to the other side edge of each air bearing surface 2. Such a transverse pressurization contour (or "TPC") causes a pressure distribution across each air bearing surface 2 that is substantially symmetrical from side to side. This construction makes the slider assembly flying height and roll angle essentially insensitive to skew angle and/or access velocity and/or air flow speed. A design of a slider having such a transverse pressurization contour is disclosed in U.S. Pat. No. 4,673,996. That patent shows three transverse pressurization contours for air bearing sliders (see FIGS. 6 and 7 of that patent).

One problem that arises with the TPC design is in fabricating the fairly precise angles or angular structures required to form the transverse pressurization contour on an error bearing edge. Considering the contours shown in U.S. Pat. No. 4,673,996, the angled contours of the left hand air bearing surface of FIG. 6, and the rounded contours shown in FIG. 7, are difficult to manufacture on a repetitive, reliable basis. The "stepped" TPC structure shown in the right hand air bearing surface in FIG. 6 is generally more desirable from a manufacturing point of view because the width and depth of the step structure can be more readily controlled than an angled or rounded contour. Moreover, in terms of the horizontal lift surface provided for the slider air bearing surface, the step structure is preferred.

Even though the step structure is preferred over the other transverse pressurization contours, such a structure is still quite expensive to manufacture. Normally, such a step structure could not be machined into the slider air bearing surface using conventional machining. The depth of the step is typically about 30 microinches, ±5 microinches. Conventional machining in a production environment permits tolerances of only about ±300 microinches. Further, since the entire width of a typical air bearing surface is only about 0.635 mm, and the typical width of each TPC is about 127 mm (meaning that about 40% of the air bearing surface of a rail is occupied by two TPC's for that rail), such machining is difficult and time consuming, and therefore expensive.

A second method of fabricating such a step structure would be to etch (e.g., chemically etching) the slider material. However, most sliders are made of calcium titanate or polycrystalline ferrite material, zirconia, or alumina titanium carbide (for thin film heads). These materials are not generally etchable with the degree of precision required to make a step structure. While single-crystal ferrite material can be chemically etched, this material is at present quite expensive, and requires a relatively expensive photomasking operation to shield portions that are not to be etched.

Another method for forming the TPC step structure is ion milling. However, this process is expensive.

Therefore, it would be desirable to have a method of forming transverse pressurization contours into the air bearing surfaces of a slider at low cost, and with the precision requisite in forming such TPC's. The present invention provides such a method.

SUMMARY OF THE INVENTION

The invention forms transverse pressure contours by first forming slots in a slider blank adjacent the location where air bearing surfaces are to be formed. The slots are filled with an etchable material (e.g., glass), and the slider blank is then machined to form air bearing structures. The etchable material is positioned so as to form a part of the side edge of the air bearing structure. The slider blank is then subjected to an etching process that principally etches the etchable material. By proper positioning and etching, the etchable material forms a transverse pressure contour on the side edge of the air bearing structure.

The invention has other uses with respect to forming complex, high precision structures within a slider body. Basically, any structure that can be formed by etching an etchable material away from the bulk material of the slider body can be manufactured. The basic shapes can be created by grinding or molding, back-filling with an etchable material (such as glass), and then etching the etchable material. One such structure is a zero-load slider.

The details of the preferred embodiment of the present invention are set forth below. Once the details of the invention are known, numerous additional innovations and changes will become obvious to one skilled in the art.

BRIEF DESCRIPTION OF THE DRAWINGS

Like numbers and designations in the drawings refer to like elements.

DETAILED DESCRIPTION OF THE INVENTION

Throughout this description, the preferred embodiment and examples shown should be considered as exemplars, rather than limitations on the method of the present invention.

Figure 1:
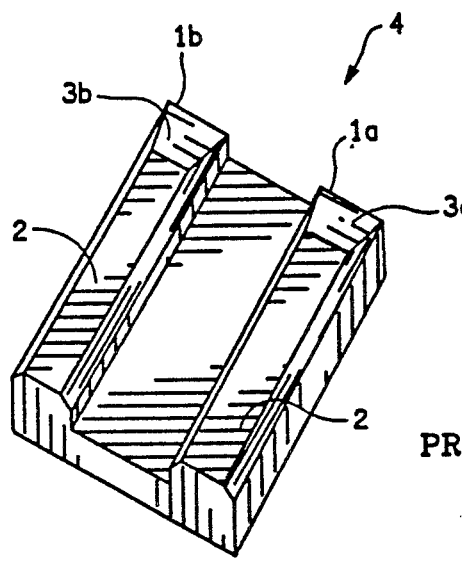
FIG. 1 is a perspective view of a prior art slider.
Figure 2:
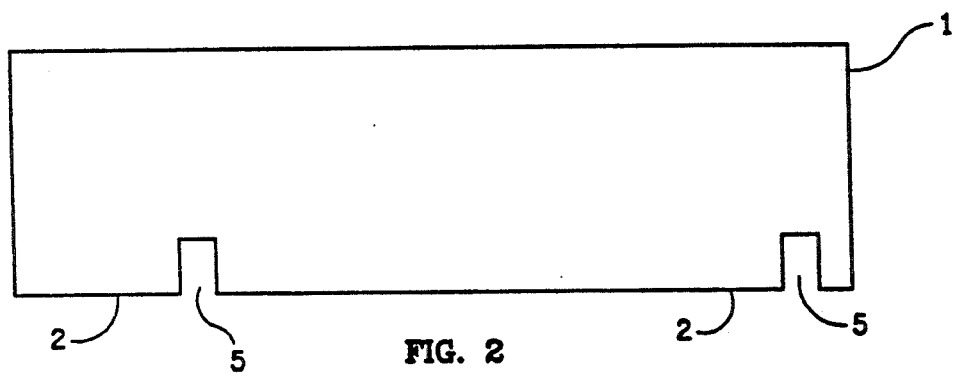
FIG. 2 shows a cross-sectional view of a slider blank during a first phase of fabrication in accordance with the present invention.

FIG. 2 shows a cross-sectional view of a slider blank 1 during the first phase of fabrication. The slider blank 1 may be made from any desired material, including calcium titanate, monocrystalline or polycrystalline ferrite, alumina titanium carbide, silicon carbide, silicon nitride, or any other relatively hard, wear-resistant material such as a ceramic or hard glass. The inventive method is not limited to a particular material for the slider body, as long as the material chosen is resistent to the selected etching process (described below).

To form a transverse pressurization contour on at least one side of a slider air bearing surface 2, a slot 5 is cut in the slider blank 1 for each desired TPC. As shown in FIG. 2, two such slots 5 have been cut in the illustrated embodiment. As an alternative to grinding the slots 5, it is possible with certain materials to mold the slots. The slots 5 need not be of equal width. One advantage of providing slots 5 with different widths is to alter the pressurization characteristics of the TPC's to "tune" the slider for optimal flying height of the slider air bearing surface 2 supporting the electromagnetic core of the slider.

Each of the slots 5 is then filled with an etchable material 6, such as a glass of the type commonly used in manufacturing sliders. If glass is used, the glass is melted into each slot 5, preferably during an existing process step, such as when an electromagnetic core is bonded to the slider. Thus, this step of the inventive process can be practiced without an additional process step during the manufacture of a slider.

Figure 3:
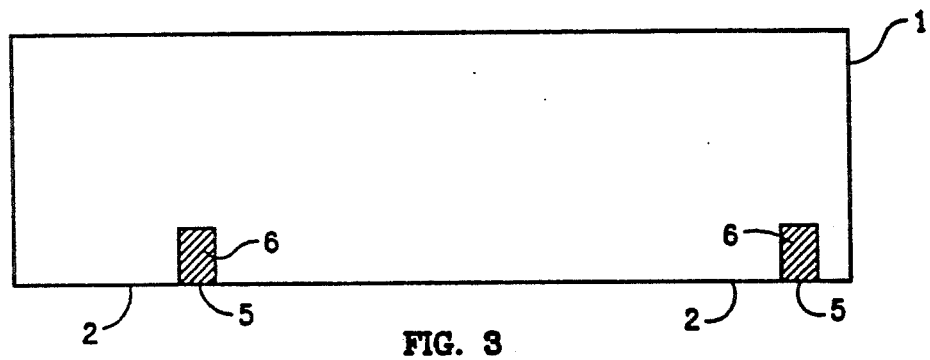
FIG. 3 shows a cross-sectional view of a slider blank during a second phase of fabrication in accordance with the present invention.
Figure 4:
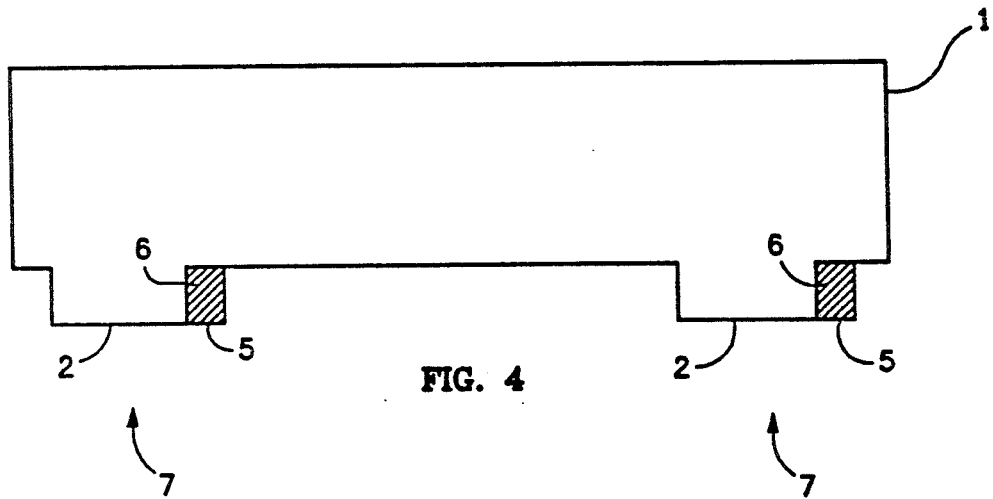
FIG. 4 shows a cross-sectional view of a slider blank during a third phase of fabrication in accordance with the present invention.

In the preferred embodiment of the invention, the surface of the slider blank 1 having the etchable-material 6 within the slots 5 is then lapped flat, in known fashion. The resulting structure is shown in FIG. 3. Using conventional grinding steps, air bearing structures 7 are formed from the surface of the slider blank 1 having the slots 5 filled with etchable material 6. The resulting structure is shown in FIG. 4. It will be noted that the air bearing structures 7 now comprise a portion formed of the bulk slider body material, as well as a portion formed by the etchable material 6.

Thereafter, the etchable material is subjected to an etching process. Etching may be done by chemical action (e.g., acid bath or reactive gas), plasma etching, mechanical etching (i.e., by lapping the air bearing surfaces 2 with an abrasive slurry, causing the slurry to abrade the etchable material 6 at a faster rate than the bulk slider body material). In the preferred embodiment, if glass is used as the etchable material, the etchant can be a 0.1% phosphoric acid solution, into which the slider body is placed for approximately 90 seconds. The etching time will vary with the strength of the etchant solution.

Figure 5:
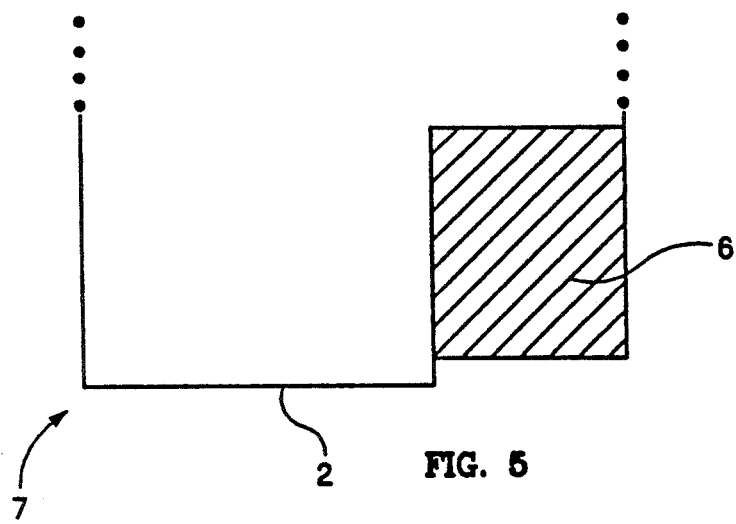
FIG. 5 shows an enlarged cross-sectional view of the air bearing structure of FIG. 4 after the step of etching in accordance with the present invention.

The etchable material 6 is etched for a desired amount of time to remove enough material to create the desired TPC structure to desired dimensions. In the preferred embodiment of the invention, the chemical etching process described above creates a TPC step structure that is recessed approximately 30 microinches below the level of each air bearing surface 2. This structure is shown enlarged in FIG. 5.

In some circumstances, if glass is used as the etchable material, it may be desirable to prevent the glass used for bonding the electromagnetic core to a slider body from being etched along with the glass within the slots 5. The core glass area can be protected during etching by means of a masking operation (such as by using an acrylic liquid compound), or by using a glass that is more resistant to the selected etchant. Alternatively, the slider design can take into account that the core glass area may be etched to a slight degree, and the operational characteristics of the slider can be adjusted accordingly.

Because a slider has an air bearing layer between its air bearing surfaces 2 and a rotating recording medium, the air bearing structure 7 will be subjected to little or no abrasive conditions. Also, the TPC's surfaces formed from the etchable material 6 are further spaced from the recording medium surface by the amount of recess created during the etching process. Therefore, the hardeness of the etchable material 6 is not particularly important, because that material will normally not be subjected to contact with the recording medium.

TPC contours can be formed on one or both sides of an air bearing structure 7, on one or more air bearing structures 7, symmetrically or asymmetrically with respect to the air bearing structures 7, and can be of different widths and depths (for example, by using two etchable materials having different etch rates).

An important aspect of the present invention is that it is completely compatible with current slider fabrication techniques. No special high-precision milling steps are required to directly form the TPC's, and the bulk material for the slider blank 1 is not restricted to material suitable for photomask etching.

The present invention has other uses with respect to forming complex, high precision structures within a slider body. Basically, any structure that can be formed by etching an etchable material away from the bulk material of the slider body can be manufactured. The basic shapes can be created by grinding or molding an opening or aperture, back-filling the opening or aperture with an etchable material (such as glass), and then etching the etchable material a desired amount or to a desired depth. One such structure is a zero-load slider, which has one or more negative-pressure cavities formed in the disk-side of the slider between the air bearing surfaces. The negative-pressure cavities help maintain a downward force on the slider to provide close spacing between the slider and the recording medium.

A number of embodiments of the present invention have been described. Nevertheless, it will be understood that various modifications may be made without departing from the spirit and scope of the invention. Accordingly, it is to be understood that the invention is not to be limited by the specific illustrated embodiment, but only by the scope of the appended claims.

I claim:

1. A method of manufacturing structural elements in air bearing sliders comprising the steps of:
   a. forming an aperture in a top slider blank surface of an air bearing slider blank positioned at the location of a desired structural element;
   b. filling each aperture with an etchable material, the etchable material having an exposed etchable material surface;
   c. selectively etching the exposed etchable material surface to a desired depth below an adjacent slider blank surface, thereby forming the desired structural element, whereby the top slider blank surface is not substantially etched.

2. The method of manufacture of claim 1, wherein the air bearing slider blank is selected from the group consisting of: ceramic or glass.

3. The method of manufacture of claim 1, wherein each aperture is formed by grinding.

4. The method of manufacture of claim 1, wherein each aperture is formed by molding.

5. The method of manufacture of claim 1, wherein the etchable material is glass.

6. The method of manufacture of claim 1, wherein the step of etching comprises exposing the slider blank to a chemical etchant.

7. The method of manufacture of claim 6, wherein the chemical etchant is a phosphoric acid solution.

8. The method of manufacture of claim 1, wherein the step of etching comprises exposing the slider blank to a plasma etchant.

9. The method of manufacture of claim 1, wherein the step of etching comprises exposing the slider blank to an abrasive etchant.

10. The method of manufacture of claim 1, wherein the etchable material is glass, and the step of etching comprises exposing the slider blank to a chemical etchant.

11. The method of manufacture of claim 10, wherein the chemical etchant is a phosphoric acid solution.

12. A method of manufacturing, transverse pressurization contours on at least one edge of an air bearing slider blank surface, comprising the steps of:
    a. forming a slot in an air bearing slider blank positioned at the location of each desired transverse pressurization contour;
    b. filling each slot with an etchable material having at least one exposed etchable material surface;
    c. forming at least one air bearing slider structure incorporating at least one filled slot as part of an edge of each air bearing slider blank surface;
    d. selectively etching the exposed etchable material surface to a desired depth below the adjacent air bearing slider blank surface, thereby forming a transverse pressurization contour as part of at least one edge of each air bearing slider blank surface, whereby the slider blank surface is not substantially etched.

13. The method of manufacture of claim 12, wherein the air bearing slider blank is selected from the group consisting of ceramic and glass.

14. The method of manufacture of claim 12, wherein each slot is formed by grinding.

15. The method of manufacture of claim 12, wherein each slot is formed by molding.

16. The method of manufacture of claim 12, wherein the etchable material is glass.

17. The method of manufacture of claim 12, wherein the step of etching comprises exposing the slider blank to a chemical etchant.

18. The method of manufacture of claim 17, wherein the chemical etchant is a phosphoric acid solution.

19. The method of manufacture of claim 12, wherein the step of etching comprises exposing the slider blank to a plasma etchant.

20. The method of manufacture of claim 12, wherein the step of etching comprises exposing the slider blank to an abrasive etchant.

21. The method of manufacture of claim 12, wherein the etchable material is glass, and the step of etching comprises exposing the slider blank to a chemical etchant.

22. The method of manufacture of claim 21, wherein the chemical etchant is a phosphoric acid solution.

* * * * *